March 19, 1957     B. T. J. VANCE     2,785,698
SAFETY VALVE
Filed Aug. 18, 1953
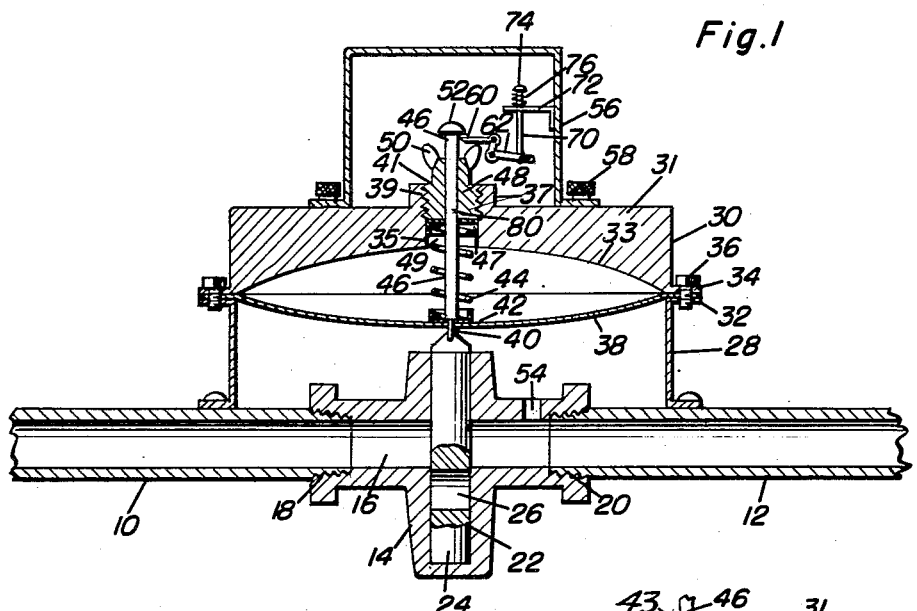
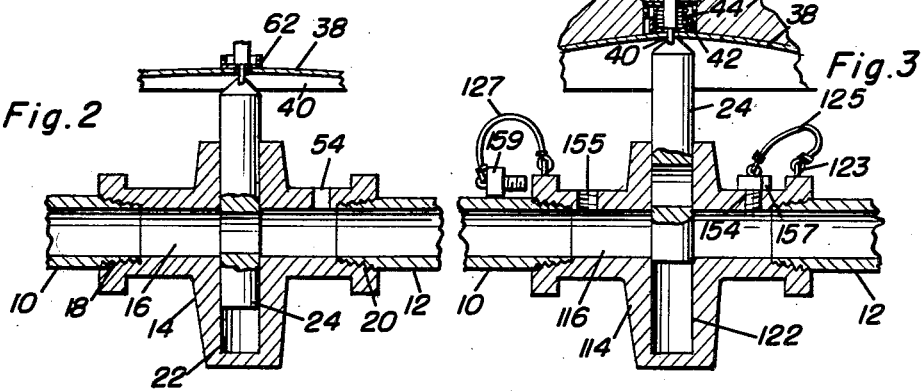
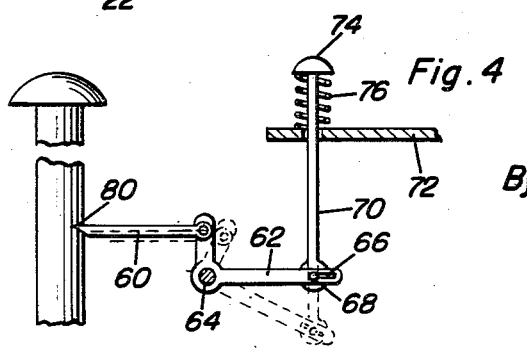
Byron T. Jack Vance
INVENTOR.

United States Patent Office 2,785,698
Patented Mar. 19, 1957

2,785,698

SAFETY VALVE

Byron T. Jack Vance, Kilgore, Tex., assignor of one-half to J. J. Jenkins and W. R. Yazell, Kilgore, Tex.

Application August 18, 1953, Serial No. 375,010

1 Claim. (Cl. 137—458)

This invention relates to a safety valve and particularly to a valve to be installed in a fluid supply line, particularly a gaseous supply line, and responsive to the pressure therein for opening or closing the valve.

In the operation of fluid supply lines, it frequently happens that for some reason an over-pressure or under-pressure should result in the line, and if the abnormal condition exists and then a normal condition afterwards exists without closing the line, serious damage may result, for example, if the fluid is a gaseous fuel and the failure of pressure should result, the pilot lights and other burners might be extinguished, and then the resumption of flow should fill the space with gas which could be ignited and cause a serious explosion or fire. On the other hand, if an extremely high pressure of gas should occur in the line without closing the line, a serious accident could result.

The present invention provides a safety valve responsive to either under- or over-pressure, and having a manual set device so that after it has operated in either direction, it must be manually reset before the line will again carry fluid.

In the construction according to the invention, a valve body is provided with a sliding valve gate having a valve passage therein and a biasing means urging the valve downward to closed position and a diaphragm responsive to the pressure in the line for lifting the valve gate to a normal open position, and further operative in response to an abnormal high pressure for lifting the gate to closed position and a detent operative in the abnormal high position to retain the valve in closed position.

It is accordingly an object of the invention to provide an improved safety valve.

It is a further object of the invention to provide a safety valve operative under either abnormally high or low pressure.

It is a further object of the invention to provide a safety valve which must be manually reset when closed from any cause.

It is a further object of the invention to provide a safety valve responsive to pressure on either side of the valve gate.

Other objects and many of the attendant advantages of the present invention will be apparent from the following detailed description taken in conjunction with the accompanying drawings in which:

Figure 1 is a vertical sectional elevation of a cut-off valve responsive to abnormal pressures to close a supply line and shown in closed position in response to a failure of pressure;

Figure 2 is a fragmentary section similar to Figure 1, but showing the valve held open in response to normal pressure;

Figure 3 is a view similar to Figure 2 showing a slight modification according to the invention with the valve closed in response to high pressure; and Figure 4 is a detail of the lock-out responsive to high pressure.

In the exemplary embodiment according to the invention, a fluid conduit 10 is connected to a conduit 12 by means of a valve body 14 having a fluid passage 16 therein. The conduit section 10 is connected to the body 14 by any suitable means, such as the threads 18. Likewise, the conduit section 12 is similarly connected to the body 14 by threads 20. A transverse valve passage 22 is provided in the body 14 and a sliding valve gate 24 is slidable in the transverse passage 22 with the valve gate 24 having an aperture 26 for the passage of fluid therethrough.

A housing 28 encloses the valve body 14 and is secured in gas-tight relation to the conduit sections 10 and 12 and is provided with a cover 30 which is joined to the housing 28 by means of flanges 32 and 34 and set screws 36. A diaphragm 38 extends across the housing 28 and is secured between the flanges 32 and 34 in gas-tight or fluid-tight relation.

The top 31 of the cover 30 is of considerable thickness and has a concave face 33 adapted to receive the diaphragm 38 to prevent excessive distortion and possible damage by over-pressure in the housing 28. The top 31 is provided with a central aperture 35 about which is an upstanding collar 37 provided with threads 39 to receive an adjusting stem 41 having external threads 43. The stem 41 is provided with a bore 48. A manual control rod 46 is operatively connected to the diaphragm 38 and extends through the bore 48 in freely sliding relation with the adjusting stem 41.

A cup or spring follower 42 is mounted on the diaphragm 38 about the end of rod 46. A similar cup or spring follower 47 is mounted on the end of the adjusting stem 41 and a tension spring 44 is mounted about the rod 46 and is received in the spring followers 42 and 47 to bias the diaphragm 38 to closing position of the valve 24. The adjusting stem 41 being provided with wings 50 whereby the stem 41 may be readily adjusted to control the tension on the spring 44. The stem 41 preferably terminates in spaced relation to the surface to provide a recess 49 to receive the compressed spring 44.

A protruding end or top 52 is placed on the rod 46 for manual engagement so that the rod 46 may be lifted manually to lift the diaphragm 38 and open the valve gate 24 so that the fluid will flow through the aperture 26.

An aperture 54 is provided in the body 14 and communicates with the passage 16.

A closure 56 is placed over the protruding end 52 of the rod 46 and secured in substantially fluid-tight relation by means of the cap screws 58.

A high pressure lock-out comprises a pawl 60 mounted on a bellcrank 62 which is pivoted on a bolt 64 secured in the closure 56 and having a slot 66 adjacent one end thereof in which is slidably received a pivot pin 68 secured in the end of a push rod 70 which extends upwardly through a bracket 72 and is provided with a push head 74 having a spring 76 between the push head 74 and the top of the bracket 72 so that the pawl 60 is constantly pressed against the pull rod 46. Pull rod 46 is provided with a detent or slot 80 into which the pawl 60 may slide when the rod 46 is raised upwardly in response to high pressure to lock the rod 46 in such position that the valve gate 24 closes the passage 26.

In the modification according to Figure 3, a valve body 114 is provided with a fluid passage 116 and has a transverse slot 122 for receiving the valve gate 24. The body 114 is provided with apertures 155 and 154 arranged on opposite sides of the valve gate 24 and each of the apertures 154 and 155 is provided with a screw plug 157 and 159 which may be selectively screwed into place to close either or both of the apertures 154 and 155. The screw plugs 157 and 159 are attached to the body 114 by means of eye-bolts 123 and suitable thongs 125.

In the operation of the safety valve according to the invention, the resilient member 44 will normally maintain the valve gate 24 in closed position so that the valve will be closed. When it is desired to actuate the safety valve, the closure 56 will be removed and the rod 46 will be lifted to open the valve passage 26 so that the fluid may flow through the aperture 54 and the pressure in the housing 28 will act against the diaphragm 38 to maintain the diaphragm 38 in extended position as shown in Figure 2. Upon a failure of pressure in the passage 16, and particularly in that portion connected to the section of conduit 12, the fluid in the housing 28 will escape through the aperture 54 so that the spring 44 will close the valve and prevent the flow of fluid therethrough in the event the fluid pressure should be restored.

In the event of high pressure in the conduit section 12, the high pressure would distend the diaphragm 38 as shown in Figure 3 so that the pawl 60 would engage the notch 80 and lock the gate 24 in upraised position to close the valve as shown in Figure 3. The closure 56 is normally maintained in position over the reset rod 46 and the reset button 74, and they may obviously be readily removed by removing the cap screws 18 to permit manual adjustment of the valve. As suggested in Figure 3, the device may be responsive to pressure on either side of the valve so that the valve may operate in either direction, or the valve may automatically reopen in response to restoration of pressure under certain circumstances.

It will be apparent that the present invention provides a complete safety device for inhibiting pressure variations of dangerous magnitude in either direction in a fluid conduit and locking the device out until it is manually reset.

For purposes of exemplification, a particular embodiment of the invention has been shown, and described according to the best present understanding thereof. However, it will be apparent to those skilled in the art that many changes and modifications in the construction and arrangement of the parts thereof may be resorted to without departing from the true spirit and scope of the invention.

What is claimed as new is as follows:

A safety valve for a fluid pressure line comprising a valve body adapted to be interposed in said line and having a fluid passage therein adapted to pass fluid under pressure from said line through said body, an apertured valve gate in said body bisecting said passage and slidable into opposite limits of movement to close said passage and into an intermediate position to open said passage, a housing around said body, a fluid pressure responsive diaphragm in said housing operatively connected to said gate and flexible to slide said gate from one limit of movement into its intermediate position and into its other limit of movement, said body having an opening therein for discharging fluid pressure from said passage into said housing for introducing fluid pressure to said diaphragm, a spring-loaded rod slidably extended into said housing and operatively connected to said diaphragm to flex the diaphragm and move the gate from one limit of movement into its intermediate position in opposition to the loading spring, a notch in said rod, and a spring-loaded releasable pawl for lockably engaging said notch to lock said rod in one limit of movement of said gate.

References Cited in the file of this patent

UNITED STATES PATENTS

| | | |
|---|---|---|
| 770,866 | Mullin | Sept. 27, 1904 |
| 1,501,331 | Gulick | July 15, 1924 |
| 1,516,011 | Heath | Nov. 18, 1924 |
| 1,960,284 | White | May 29, 1934 |
| 2,295,611 | Smith | Sept. 15, 1942 |
| 2,597,582 | Gruss | May 20, 1952 |
| 2,626,633 | Wilson | June 27, 1953 |

FOREIGN PATENTS

| | | |
|---|---|---|
| 478,156 | Great Britain | of 1938 |
| 94,049 | Sweden | of 1939 |